June 22, 1937.  R. W. GRACE  2,084,438
METER SUPPORT
Filed Dec. 20, 1935
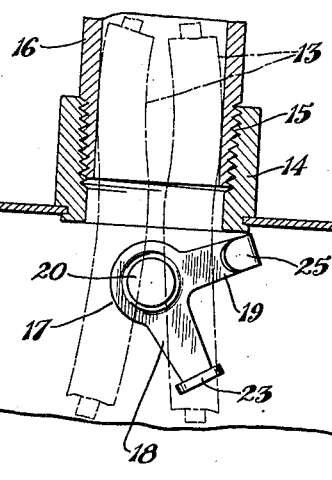
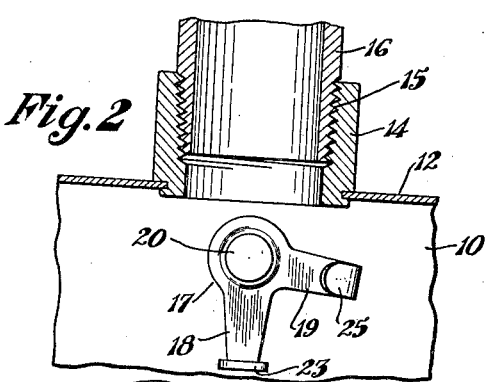
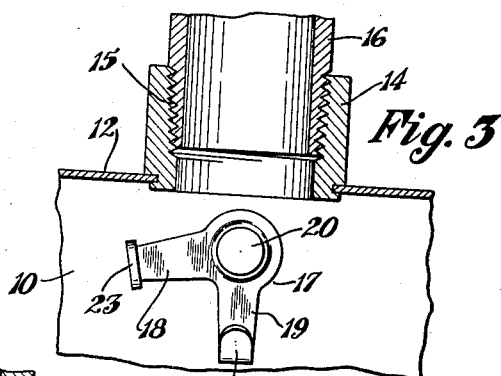
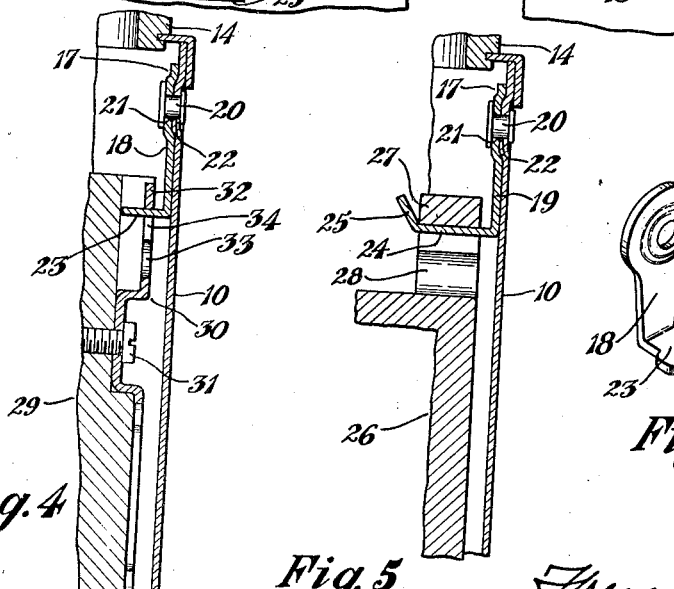
Inventor
R. W. Grace
By Frease and Bishop
Attorneys Patented June 22, 1937

2,084,438

UNITED STATES PATENT OFFICE 2,084,438

METER SUPPORT

Richard W. Grace, Canton, Ohio, assignor to The Superior Switchboard & Devices Company, Canton, Ohio, a corporation of Ohio Application December 20, 1935, Serial No. 55,471

1 Claim. (Cl. 247—2)

The invention relates to supports for electric meters and particularly to means for supporting a meter within a meter box.

The object of the improvement is to provide a support for meters which is quickly and easily adaptable for supporting old style meters or the present type A and B standardized meters.

Another object is to provide a support of this character comprising a pivoted bracket having two angular legs, one for supporting the old style meters and the other for supporting the type A and B standardized meters.

A further object is to provide a meter support adapted to be easily and quickly moved to a position to permit heavy cables to be inserted through the usual opening for that purpose in the meter box.

The above objects together with others which will be apparent from the drawing and following description or which may be later pointed out, may be attained by constructing the improved meter support in the manner illustrated in the accompanying drawing, in which Figure 1 is a fragmentary sectional view of the upper portion of a meter box provided with the improved meter support, showing the same moved to position to permit cables to be inserted into the box;

Fig. 2, a similar view showing the support in position to support a type A or B standardized meter;

Fig. 3, a similar view showing the support in position to support an old style meter;

Fig. 4, a fragmentary transverse sectional view showing the manner in which a type A or B standardized meter is supported;

Fig. 5, a similar view showing the manner in which an old style meter is supported; and Fig. 6, a detached perspective view of the meter support to which the invention pertains.

Similar numerals refer to similar parts throughout the drawing.

The improved meter support to which the invention pertains may be mounted within a meter box of any suitable design, including a back wall 10, side walls 11 and top wall 12. The top wall, as in usual practice, may be provided with an opening through which cables as indicated at 13 may be inserted into the box for connection to the meter and this opening may be provided with the usual nipple 14, preferably internally threaded as at 15, to receive the threaded end of a conduit 16 within which the cables 13 may be housed.

The improved meter support may be in the form of a bracket indicated generally at 17, provided with two angular legs 18 and 19 radially disposed and located substantially at a right angle to each other.

The bracket may be pivotally connected to the back wall 10 of the box at a point adjacent to the nipple 14 as by the rivet 20 which is located through an aperture 21 in the bracket 17 and through a suitable aperture 22 in the back wall 10 of the box.

The leg 18 of the bracket is provided at its lower end with an angular ear 23 of substantially T-shape as best shown in Fig. 6, and the leg 19 has at its lower end the integral substantially horizontal foot 24 terminating in the upturned angular end 25.

As shown in Fig. 1, the bracket may be swung into a position with the leg 19 swung to one side of the nipple 14 so as to move the foot 24 thereof into position to permit the cables 13 to be inserted through the nipple into the box. As the T-head 23 upon the leg 18 is comparatively short, the same does not interfere with the cables as they are inserted into the box.

There are at present in use a great many old style electric meters as illustrated fragmentarily at 26 in Fig. 5, provided with a lug 27 on the back wall at the top thereof for mounting the meter in a box or upon a board or the like.

The leg 19 is provided for mounting these old style meters and as shown in Fig. 5, the foot 24 of said arm is inserted into the socket 27 in the back wall of the meter, the upturned angular end 25 being received in the key hole slot 28 in the lug 27. The meter is thus supported in proper position within the box and may be readily attached or detached as desired. It will, of course, be understood that in order to mount one of these old style meters, the bracket 17 is swung to the position shown in Fig. 3 with the leg 19 depending vertically from the pivot 20.

In order to mount the type A or B standardized meters such as have now come into general use, the bracket is swung to the position shown in Fig. 2 with the leg 18 depending vertically from the pivot 20. In Fig. 4 is illustrated at 29 a fragmentary portion of the back wall of one of these type A or B meters. Such meters are provided with an attaching bracket indicated generally at 30 secured to the back of the meter as by a screw 31, the bracket having an offset upwardly disposed arm 32 provided with a keyhole slot comprising the enlarged lower portion 33 and the restricted upper portion 34.

To support the meter upon the leg 18, the

T-head 23 of said leg is inserted through the enlarged portion 33 of the keyhole slot and the meter is then lowered so that the restricted upper portion 34 of the keyhole slot receives the narrow portion of the T-head 23 of the leg, thus securely supporting the meter in position and at the same time providing for easily removing the meter when desired.

I claim:

In combination with a meter box having a back wall, and a top wall having an opening therein, a bracket pivoted upon the back wall directly below said opening, a leg upon said bracket having an angular inturned end portion for supporting a meter, the bracket being arranged to be swung upon its pivot swinging said leg to one side of the opening to a position permitting cables to be inserted through said opening.

RICHARD W. GRACE.